UNITED STATES PATENT OFFICE.

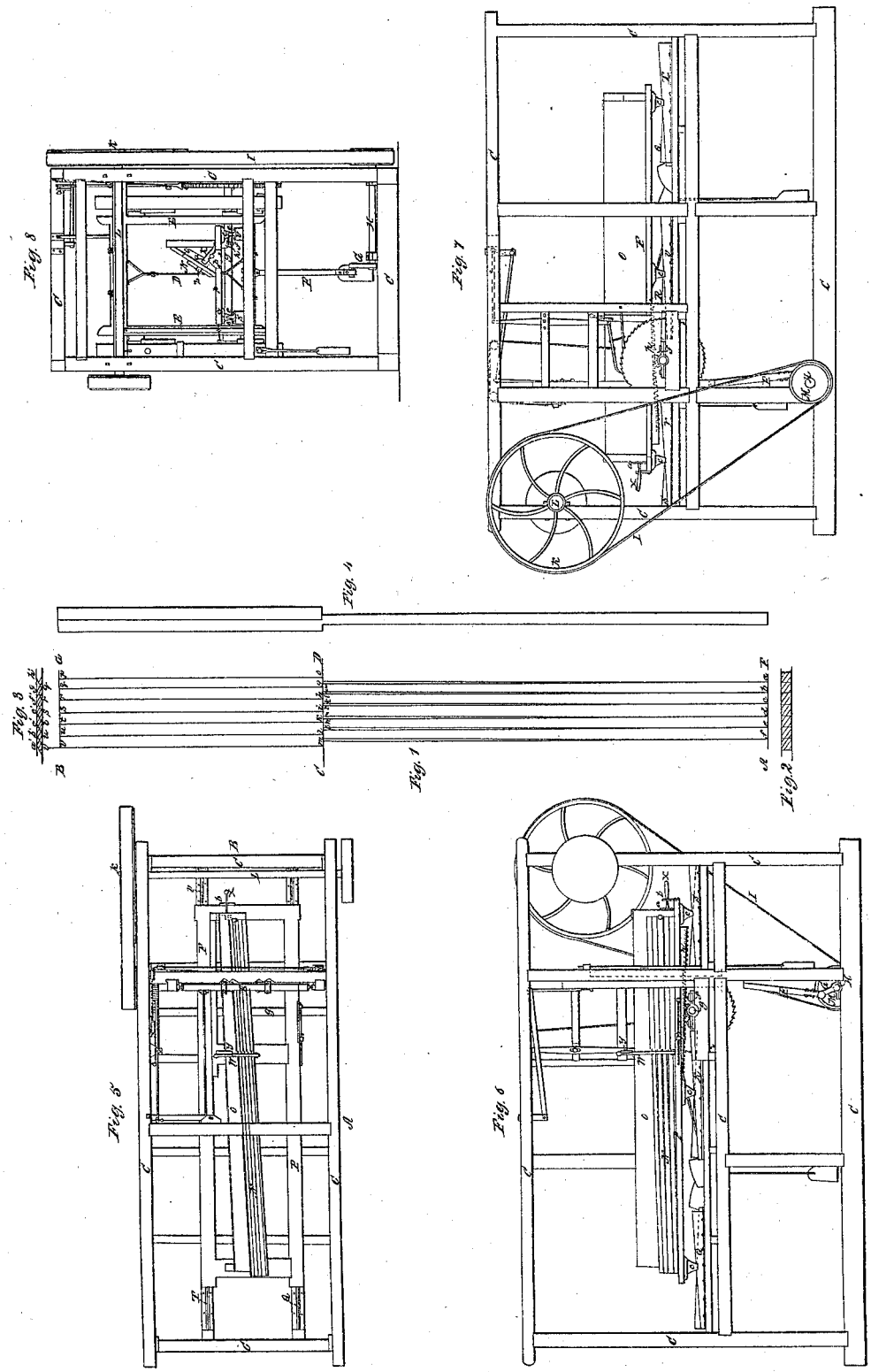

JOHN BENSON AND EZEKIEL PAGE, OF BOSTON, MASSACHUSETTS, AND RICHARDSON T. HOUGH, OF WEST LEYDEN, NEW YORK.

METHOD OF AND MACHINE FOR SAWING BOARDS INTO OARS FOR ROWING-BOATS.

Specification of Letters Patent No. 2,643, dated May 26, 1842.

*To all whom it may concern:*

Be it known that we, JOHN BENSON and EZEKIEL PAGE, of Boston, in the county of Suffolk and State of Massachusetts, and RICHARDSON T. HOUGH, of West Leyden, in the county of Lewis, in the State of New York, have invented an Improved Method or Process and Machine for Sawing Boats'-Oars from Planks or Timber, of which the following description, taken in connection with the accompanying drawings, therein referred to, forms a full and exact description.

In said specification we have set forth the nature and principles of our improvements by which they may be distinguished from others of like character together with such parts or combinations of the same as we claim and for which we solicit Letters Patent.

Heretofore it has been customary to divide a plank from which oars are to be made into pieces of a width equal to that of the blade of the oar, which blade is generally in width double that of the widest part of the rest of the oar.

Our method which is exhibited by Figures 1, 2, 3, of the drawings, is to separate the plank into strips in such manner that we obtain nearly double the number of oars from it than by any of the modes heretofore practised.

The planks from which oars are made are generally sawed of about double the thickness at one (or the handle) end than the other (or the blade) end, that is to say if the plank is three inches in thickness at one end it will be one and one half inches in thickness at the opposite.

Our method of dividing the plank for sawing is as follows: Fig. 1 exhibits a top view of the plank. Fig. 2 is a view of the thickest end. Set off at the end A, Fig. 1, the spaces $a\ b$, $b\ c$, $c\ d$, $d\ e$, $e\ f$, each equal to the greatest width we wish the oar to have near the handle—allowing for loss in sawing and finishing. Then at about one third of the length A B measuring from B to A draw a line C D parallel to the end A F of the plank, or so that the distance B C shall be a little greater than the length of the blade of the oar when finished. Then at points $o$, $g$, $h$, $i$, $k$, $l$, $m$, (which are in the line C D at the intersections of lines drawn perpendicular to the side A F at points midway between $a$ and $b$, $b$ and $c$, $c$ and $d$, &c.), draw lines $o\ p$, $g\ q$, $h\ r$, &c., perpendicular to the line C D as seen in the drawing. Next set off distances $g\ w$, $g\ x$ on each side of the point $g$ equal to half the width of the oar at the junction of the handle with the blade, and do the same at each of the points $h$, $i$, $k$, &c., as seen in Fig. 1, at $h\ i'$, $h\ k'$, $i\ k'$, $i\ m'$, &c. Draw lines $a\ w\ b\ x\ b\ i'\ c\ k'$, &c.

Fig. 3 represents an end view of the plank taken on the end B G in which it will be seen that at points $b'$, $c'$, $e'$, &c., directly opposite the points $u$, $t$, $s$, $r$, &c. (or in lines $u\ b'$, $t\ c'$, $s\ e'$ perpendicular to the line $v\ q$), diagonal lines $b'\ v\ c'\ u\ e'\ t$, &c., are to be drawn which represent the direction or diagonal position which the saw should have with respect to the portion B G, D C of the plank. The plank is thus to be sawed diagonally on the lines $o\ p$, $g\ q$, $h\ r$, &c., and from A F to C D it is sawed on lines $a\ w$, $b\ x\ h\ i\ c\ k'$, &c., perpendicularly to its upper and lower faces. The remaining parts of the plank or points at which it adheres in the plane of the line C D may be separated by a chisel. Thus the plank will be cut up into portions as represented in Fig. 4, from each of which an oar can be formed; and generally on this plan of dividing the same, about double the number of oars can be obtained from a plank than by the methods heretofore employed.

As the plank is thicker on the line C D than at its end B G, in order that the saw may follow regularly on the straight lines $u\ l$, $t\ k$, &c., it must make a "winding cut", and the cut so made will give the blade of the oar the requisite increase in thickness, from the extreme end of it toward that part connected with the handle.

The machinery which is hereinafter described is for the purpose of sawing the blade portion of the oars from the plank, the same being represented in Fig. 5 which is a top view of it in Fig. 6, which is an elevation of the side A in Fig. 5; in Fig. 7, which is an elevation of the opposite side, and in Fig. 8, which is an elevation of one end B of Fig. 5.

In the said drawings C is a frame suitably constructed to sustain the operating parts. A straight saw D Fig. 8, is properly arranged in a rectangular frame E which is supported on guides so as to be moved up and down in all respects substantially like the saw of a common saw-mill. In the drawings the saw frame is shown to be operated by a connecting rod F attached to a crank G, arranged on the end of a horizontal shaft H, the said shaft being put in motion by a belt I which passes around a pulley K on a driving shaft L and thence to and around a smaller pulley M on the shaft H.

The plank N to be sawed is first suitably marked out or divided by lines into the requisite number of oars as heretofore described and is secured upon the face of an inclined board or table O Figs. 5, 6, 7, 8. This board O is arranged and fixed upon a movable carriage or frame P resting on rails Q, R, S Fig. 6, and T U V Fig. 7, and moved forward and back longitudinally or lengthwise substantially in the same manner and by the same machinery as the carriage of the ordinary saw-mill, the said machinery being represented in the drawings, but as there is no novelty in its construction and arrangement, we do not deem it essential to further describe it.

The plank from which the rough oars are to be separated, before being fixed upon the movable carriage, is sawed by a common hand or circular saw upon the lines $a\,w$, $b\,x$, $b\,l'\,c\,k'$, &c., Fig. 1, so as to remove the triangular pieces $b$, $x\,i'$, $c\,k\,l'$, $d\,m'\,n'$, &c., which are separated at their ends $x\,i'$, $k\,l'$ $m'\,n'$, by a chisel or by any other convenient tool. This operation having been effected the plank is secured upon the inclined board O, Fig. 5, by suitable clamps or levers W, X, the former of which is jointed at its lowest end to the carriage, and is held or confined down upon the plank by being passed under the teeth of a ratchet bar Y Figs. 5, 6, while the latter acts upon the extreme end of the plank, by being bent so as to pass through the inclined board O, and projects over the edge of the plank as seen at Z Figs. 6, 8. The lever X turns upon a fulcrum in a bar or piece of metal $a$ Figs. 6, 8, and is confined in position when pressed upon the plank by a ratchet $b$. As we do not consider that there are any particular features of novelty in these methods of confining the plank to the movable carriage and as many others may be adopted with equal success we do not deem it necessary to describe them further.

As the object of the saw D is to separate from the plank those portions of it which constitute the blades of the oars—and as it was herein before mentioned that owing to the thickness of the blade gradually increasing from its extreme end in a direction toward the handle of the oar, the saw must of necessity make a winding cut, it becomes necessary that the movable carriage P should gradually change its position with respect to a horizontal plane as it is advanced forward or one side of the carriage should be somewhat depressed while the other side should be raised in a corresponding degree. This lateral movement of the carriage is effected by supporting it upon the inclined rails Q, R, S,—T U V by means of small projections or bearings $c$, $c$, $c$, Figs. 6, 7, 8, attached to the under side of the carriage and which rest immediately upon the rails and have shoulders $e\,e$, Fig. 8, extending downward on each side of the rail to sustain the carriage thereon. The rails Q R S on one side of the carriage frame, incline in the direction toward the saw, while the opposite rails T, U, V, decline in the same manner, the same being seen in Figs. 6, 7. In other words while the rails on one side ascend, those of the other side descend—so that when the carriage is moved longitudinally toward the saw, it gradually changes its position so as to cause the saw to cut as before described. As each blade is sawed the oar is removed from the plank—and the plank is lowered down and clamped so as to bring the saw to act upon the succeeding blade—and so on until the whole plank is sawed up.

The carriage is moved forward by a pinion $f$ upon the shaft $g$ acting in an inclined rack $h$ attached to the under side of the carriage. The toothed rack must be somewhat inclined from a horizontal plane in order that its teeth may always engage with those of the pinion as the carriage changes its position laterally. In other respects the whole of the machinery which impels the carriage forward and back is similar to that of a common saw mill.

Having thus explained our improvements we shall claim—

1. The above-described method of dividing a plank into parts or pieces from which oars may be manufactured.

2. Also the manner of effecting the lateral movement of the carriage of the sawing machinery, by supporting said carriage on the inclined and declined rails, the whole being substantially as set forth.

In testimony that the foregoing is a true description of our said invention and improvements we have hereto set our signatures.

JNO. BENSON.
EZEKIEL PAGE.
RICHARDSON T. HOUGH.

Witnesses to signature of Benson:
  CALEB EDDY,
  EZRA LINCOLN, Jr.

Witnesses to signature of Ezekiel Page and Richardson T. Hough:
  ASHBEL FOX,
  ORSON JENKS.